Sept. 10, 1963 G. W. SCHULTZ 3,103,076
APPARATUS FOR EXTRACTING BURIED OBJECTS
Filed Jan. 5, 1962 4 Sheets-Sheet 1

Gerald W. Schultz
INVENTOR.

BY *Clarence A. O'Brien*
*and Harvey B. Jacobson*
Attorneys

Sept. 10, 1963

G. W. SCHULTZ 3,103,076

APPARATUS FOR EXTRACTING BURIED OBJECTS

Filed Jan. 5, 1962

Gerald W. Schultz
INVENTOR.

BY *Clarence A. O'Brien*
*and Harvey B. Jacobson*
Attorneys

Sept. 10, 1963    G. W. SCHULTZ    3,103,076
APPARATUS FOR EXTRACTING BURIED OBJECTS
Filed Jan. 5, 1962    4 Sheets-Sheet 3
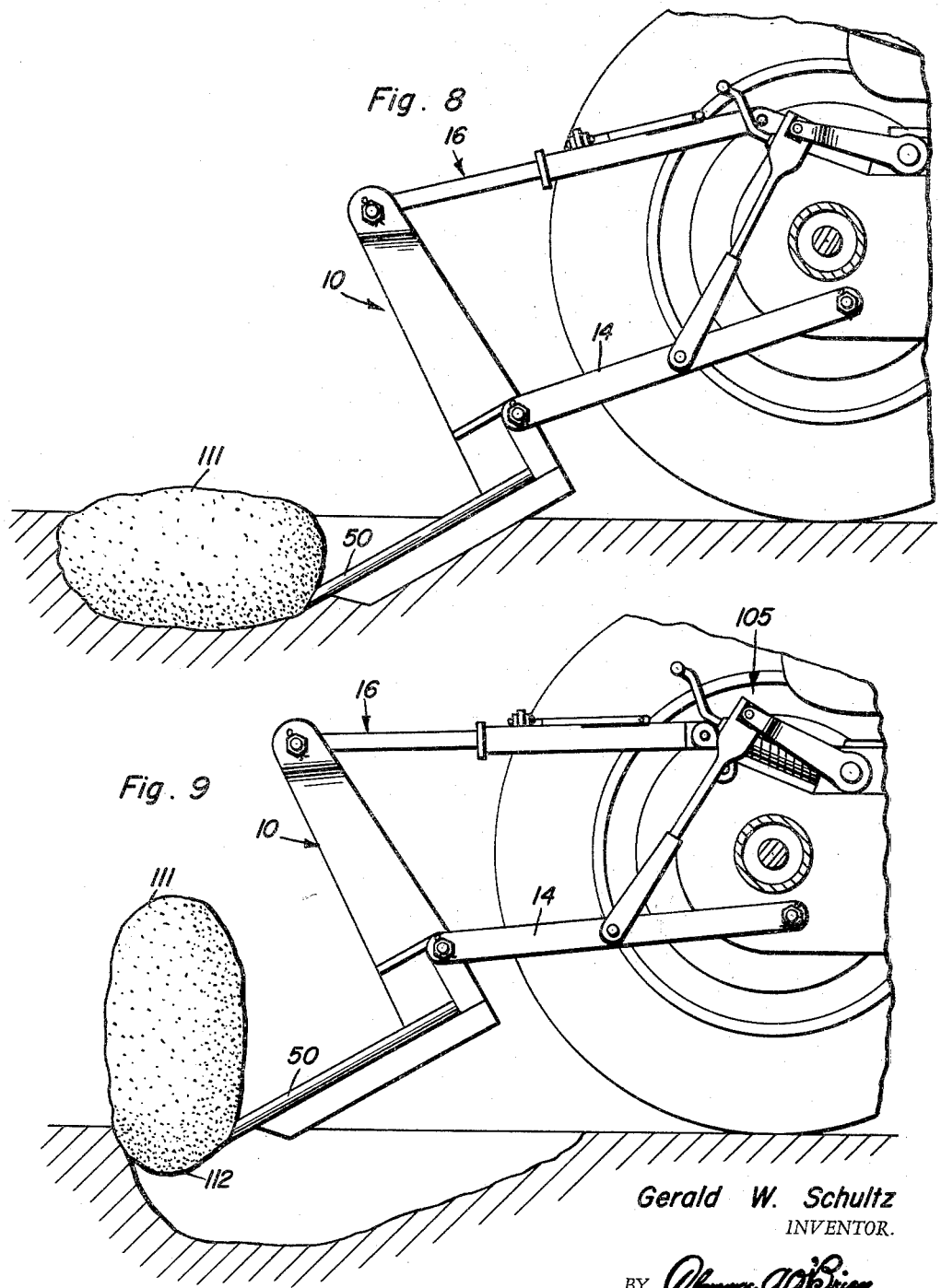
Gerald W. Schultz
INVENTOR.

Sept. 10, 1963 G. W. SCHULTZ 3,103,076
APPARATUS FOR EXTRACTING BURIED OBJECTS
Filed Jan. 5, 1962 4 Sheets-Sheet 4
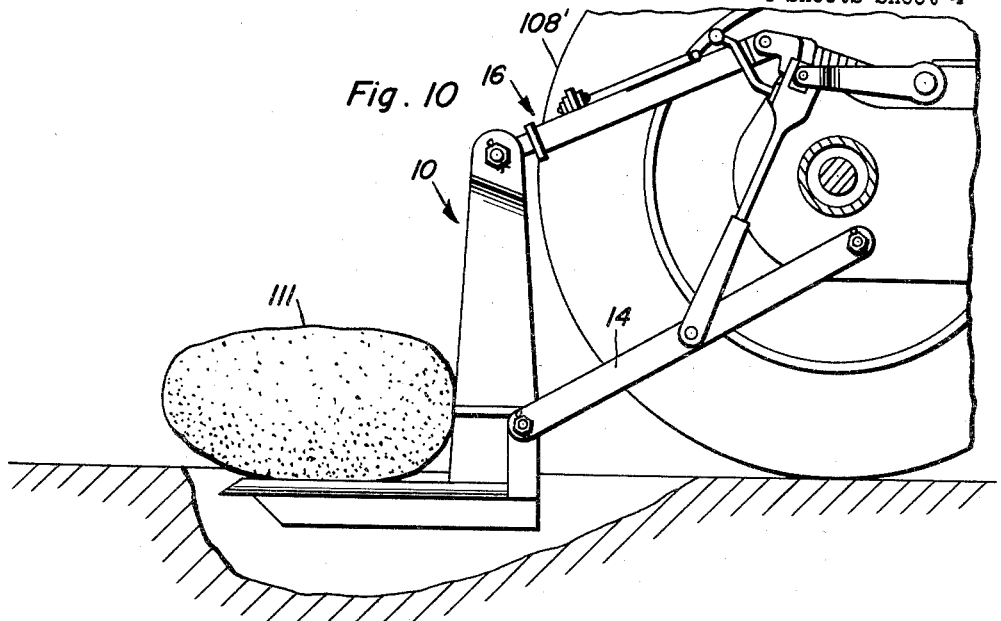
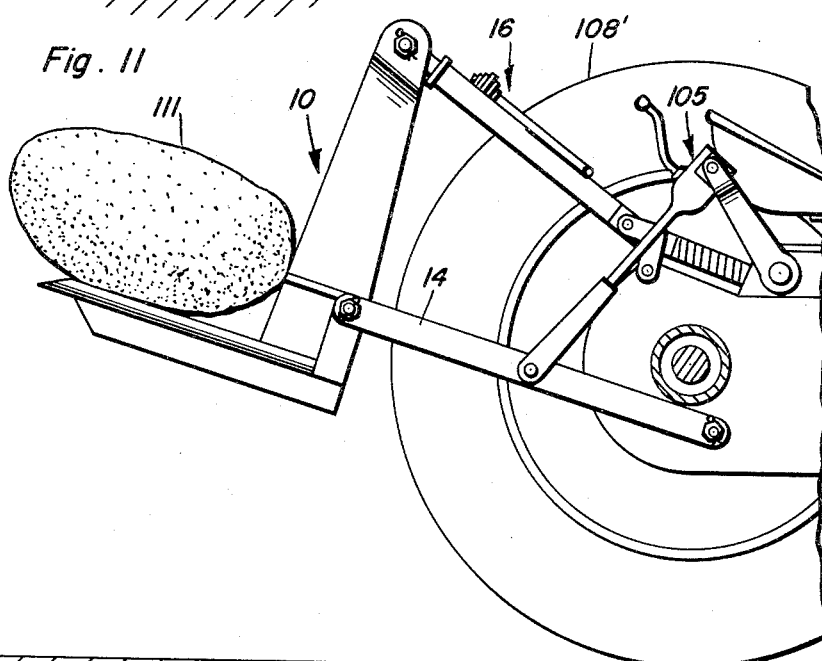
Gerald W. Schultz
INVENTOR.

United States Patent Office 3,103,076
Patented Sept. 10, 1963

3,103,076
APPARATUS FOR EXTRACTING BURIED OBJECTS
Gerald W. Schultz, Rte. 1, Portage, Wis.
Filed Jan. 5, 1962, Ser. No. 164,484
4 Claims. (Cl. 37—2)

This invention relates to a method and apparatus for extracting objects buried in the ground, and particularly to a method and apparatus for extracting heavy stones from the earth.

Accordingly, it is a primary object of this invention to provide a method and apparatus for digging deep below the surface of the ground under heavy stones, prying the stones out of the ground and transporting the stones to a suitable dump site or vehicle without the operator performing any significant physical labor.

It is another object of the invention to provide a stone digger or extractor which is adapted to fit any conventional tractor which has the ordinary three-point-hitch system.

I have discovered that an ordinary manure loader or a fork-lift may be used for picking up stones from the surface of the ground, however, these devices are unsatisfactory for prying stones from beneath the surface of the ground. Accordingly, it is a primary object of the invention to provide a device which is not only suitable for lifting stones, but is also of sufficient strength and may be properly manipulated for prying large stones from below the surface of the ground.

It is another object of the invention to provide a stone digger which is so mounted that it may move freely a limited amount in a lateral direction without danger of bending structural components thereof.

It is another object of the invention to provide a method and apparatus for removing buried objects from the earth by the use of a conventional tractor wherein the traction between the wheels of the tractor and the earth is automatically increased when the maximum traction is necessary.

It is still another object of the invention to provide an apparatus for removing buried objects such as stones from the earth which is of extremely rigid and durable construction, yet simple in design, economical to manufacture and durable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 8, 9, 10 and 11 are views similar to FIGURE 1 but illustrating how my device is used in removing a buried stone from the earth.

Figure 1:
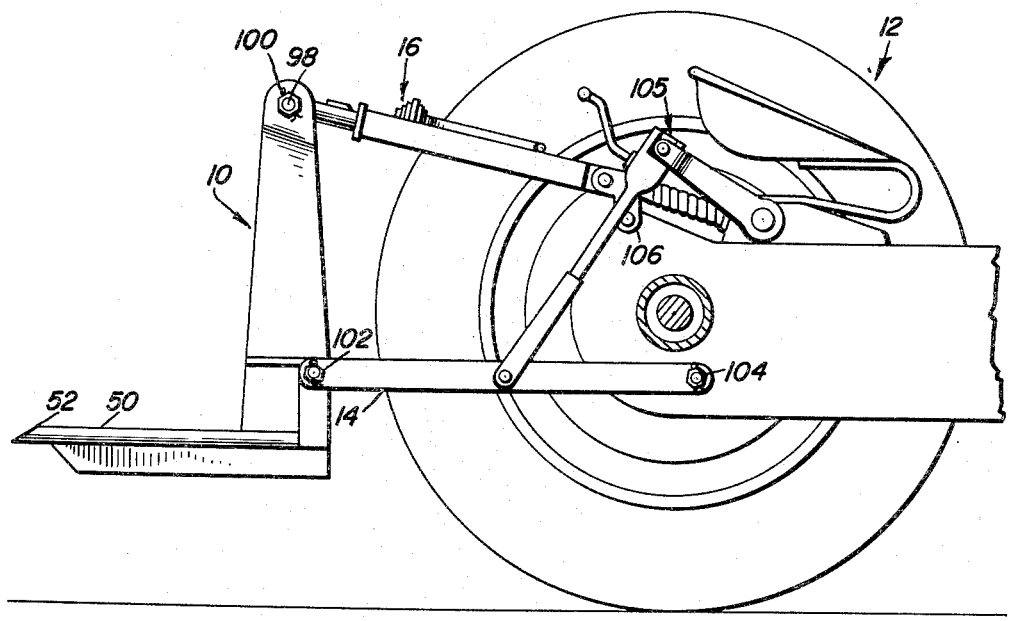
FIGURE 1 is a side elevational view showing my invention mounted on a conventional tractor with one wheel of the tractor removed.

Referring to the drawings, and particularly FIGURES 1 through 7, it can be seen that my extractor includes a generally L-shaped stone lifting assembly or fork 10 pivotally connected to a conventional tractor 12 by means of the conventional hydraulic lift arms 14 and a novel adjustable compression link 16.

The lifting assembly or fork 10 includes a vertical arm 18 of generally pyramidal shape. The arm 18 is composed of two trapezoidal side walls 20 and two trapezoidal front and rear walls 22. The upper ends of the side walls terminate in generally semicircular ears 24 spaced from one another in parallel relationship and having aligned bores 26 therethrough.

Figure 7:
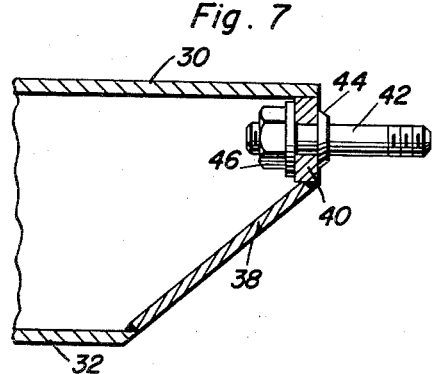
FIGURE 7 is a vertical cross-sectional view on an enlarged scale taken through an edge of the stone lifting assembly shown in FIGURE 3.
Figure 6:
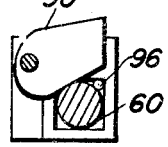
FIGURE 6 is an elevational cross-sectional view taken substantially on the plane of line 6—6 in FIGURE 5.
Figure 2:
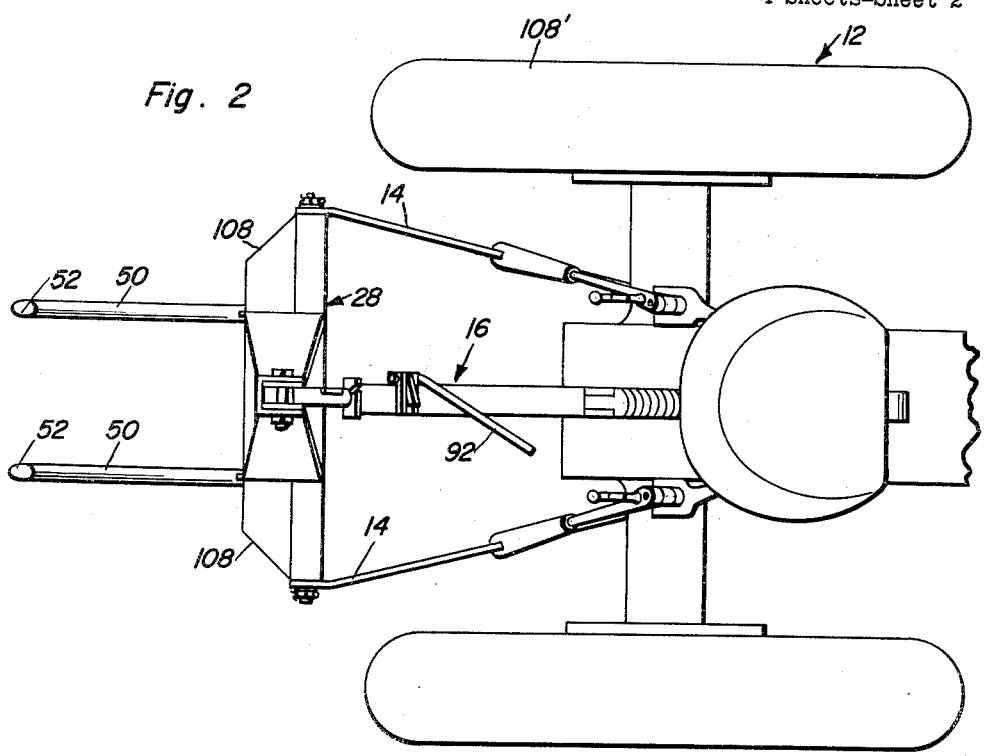
FIGURE 2 is a plan view of the device shown in FIGURE 1.
Figure 3:
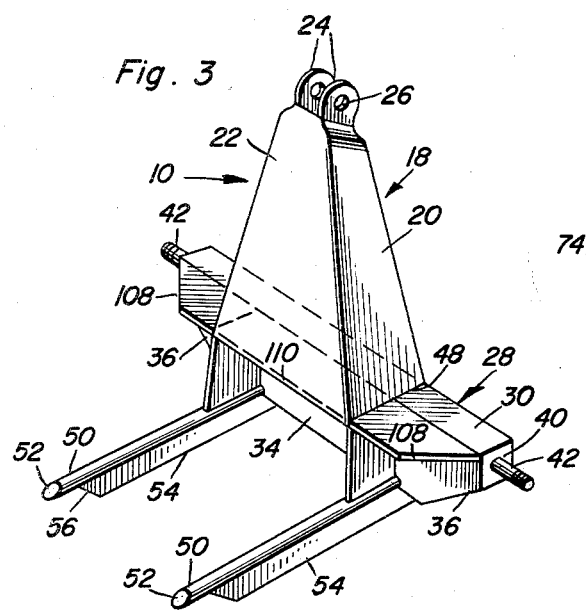
FIGURE 3 is a perspective view of the stone lifting assembly.
Figure 4:
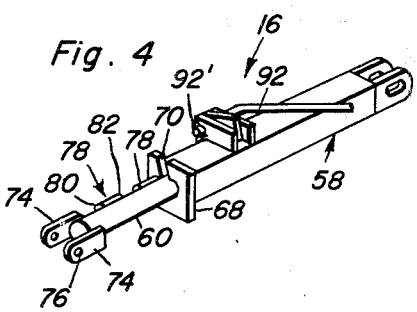
FIGURE 4 is a perspective view of an adjustable link for the stone lifting assembly.

The bottom of the vertical arm 18 is welded to a horizontal arm 28 of channel shape cross section which opens to the rear. The arm 28 as shown in FIGURES 3 and 7, comprises a rectangular upper plate 30 and a shorter rectangular lower plate 32 parallel to the upper plate and connected thereto by a front wall plate 34. The lower corners of the plate 34 are chamfered at 36 and enclosed by a sloping end plate 38. A rectangular block 40 is mounted within the rectangular opening at each end of the arm 28 which opening is formed between the plates 38, 30 and 34. A threaded pin 42 having a radial flange 44 is removably secured to each block 40 by having one end thereof inserted through a bore in the block and screwing a washer tight against the inside of the block by means of a nut 46 so as to squeeze the block tightly between the flange and washer.

The vertical arm 18 has a rectangular notch 48 formed in its rear lower corner. The arm 28 is received in the notch 48 and welded therein.

A pair of spaced tines 50 are welded to the lower edge of the front wall plate 34 of the arm 28 and extend substantially perpendicular thereto. The tines 50 preferably comprise circular rods and are chamfered at a substantially 45 degree angle at their rear ends 52. A reinforcing strip or plate 54 is welded to the lower surface of each tine 50 and to the bottom surface of the arm 28. The plates 54 extend vertically and their rear edges are chamfered as shown at 56. The side walls 20 of the vertical arm 18 extend down to and terminate on the tines 50 to which they are welded.

The adjustable link 16 comprises a hollow housing 58 which telescopically and slidably receives a shaft 60.

As illustrated, the housing 58 is of rectangular, box-like construction and includes four rectangular side walls 62. A pair of parallel ears 64 are connected to two opposed side walls 58 and extend forwardly therefrom. Elongated slots 66 are formed in the central portions of the ears 64. The rear end of the housing 58 is attached to and enclosed by a rectangular plate 68. The plate 68 is provided with a central bore for slidably receiving the shaft 60 and a notch 70 extending downwardly at an angle from its upper edge so as to intersect the bore 72 for the shaft 60.

The shaft 60 is provided at its rear end with a pair of spaced ears 74 which overlap the shaft and the free ends of the ears have aligned bores 76.

Figure 5:
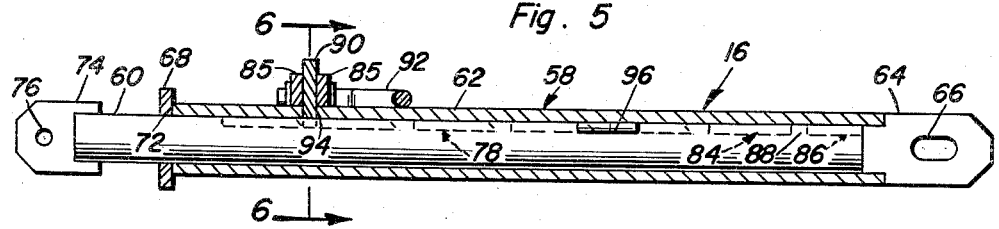
FIGURE 5 is a longitudinal vertical and enlarged cross-sectional view taken substantially through the center of FIGURE 4.

A plurality of ratchet teeth 78 are arranged in a row on the upper side surface of the shaft 60, and each of the teeth comprises a piece of small rod welded to the shaft. Each of the teeth 78 has a rear face 80 which is perpendicular to the axis of the shaft 60 and a forward face 82 which slopes at substantially a 45 degree angle towards the axis of the shaft 60. A pair of locking teeth 84 and 86 are arranged in spaced relationship at the forward end of the row of ratchet teeth 78 as shown in FIGURE 5. The locking teeth 84 and 86 are substantially the same as the teeth 78 except that both ends thereof are normal to the axis of the shaft 60. A locking recess 88 is formed between the adjacent ends of the teeth 84 and 86.

A pair of support plates 85 are secured to and extend upwardly from the upper surface of the housing 58. A space is provided between the plates 85 for receiving a locking dog 90. The dog 90 comprises a plate which is pivoted to the supports 85 by means of a handle 92 which has an inner end bent at substantially 45 degrees that extends through aligned bores in the supports 85 and dog 90. The dog 90 is rigidly secured to the end of the handle 92. The handle 92 being circular in cross section provides an effective pivot for the dog 90 between the supports 85. The upper surface of the housing 58 is provided with a slot 94 in alignment with the space between the supports 85 for receiving the dog 90. The upper and lower edges of the dog 90 are substantially parallel, however, the dog is so pivoted between the supports 85 that when it contacts the shaft 60 it may also extend between the ends of the teeth 78, 84 or 86.

The teeth 78, 84 and 86 normally fit within one of the upper corners of the housing 58. A stop 96 similar in shape to the tooth 86 is secured to the upper surface of the shaft 60 and is slidably received in the opposite upper corner of the housing 58. The teeth 78, 84 and 86, all being arranged in a row, may slide through the groove or notch 70 in the plate 68. However, the stop 96 may contact the inner surface of the plate 68 so as to prevent the shaft 60 from completely separating from the housing 58.

The ears 74 of the link 16 fit snugly between the ears 26 of the L-shaped stone lifting assembly or fork 10 and the link is pivotally connected to the assembly by inserting a bolt 98 through the bores 26 and 76. The bolt is secured in position by means of a nut and cotter pin 100.

The conventional hydraulic lift arms 14 of the tractor 12 have bores in their outer ends which receive the threaded pins 42 and are pivotally secured thereto by means of nuts 102. The lift arms 14 are pivoted in a conventional manner at 104 to a lower portion of the tractor frame or axle. The arms 14 are oscillated up-and-down by means of a conventional power operated mechanism 105. The link 16 is pivotally connected at its forward end to the tractor axle housing or frame above the lift arms 14 by means of links 106 which are pivotally connected to the tractor.

The arms 18 and 28 are reinforced by generally horizontally extending plates 108 and 110 which are coplanar with one another and the upper surface of the arm 28 and welded thereto.

In operating the extractor device for removing a buried stone such as illustrated in FIGURE 8 at 111, the operator raises the lifting arm assembly or fork 10 high off the ground by means of the power operated mechanism 105 and lift arms 14 as illustrated in FIGURE 1. He then lifts upwardly on handle 92 so as to release or remove dog 90 from between the teeth on shaft 60 so as to permit the assembly 10 to tilt counterclockwise or downwardly by gravity. The stop 96 contacts the plate 68 and maintains the assembly 10 so that the tines 50 slope towards the ground at approximately a 35 degree angle. The ends of the tines will be approximately 12 inches above the ground.

The operator then lowers the assembly or fork 10 by means of the lift arms 14 until the ends 52 of the tines contact the ground a foot or so ahead of the stone 111. He then simultaneously continues to lower the assembly 10 and back the tractor 12 by means of its powered wheels 108' towards the stone 111. The tines being canted, dig into the ground below the stone 111. Also, the chamfered ends 52 of the tines when they contact the stone tend to force the tines downwardly and the stone upwardly. When the link 16 is fully extended as illustrated in FIGURES 8 and 9, the dog 90 is in the locking recess 88 to positively prevent the link from changing its longitudinal dimension.

The reinforcing plates or strips 54 on the tines 50 facilitate their entry into the ground and prevent them from bending under strain. The strips or plates 54 being flat and vertical, act as rudders and prevent lateral movement of the tines as they move through the earth. When the tines 50 have achieved their maximum penetration into the earth and under the stone 111, the operator then continues to back the tractor and concurrently to elevate the assembly 10 by means of the lift arms 14. This imparts a vertical and a horizontal thrust to the stone 111 which will force it from its embedded position and cause it to tilt about its rear end 112 in a counterclockwise direction as viewed in FIGURE 9. It is also to be noted that the weight of the stone acting downwardly on the tines 50 increases the downward pressure on the rear wheels 108' of the tractor thereby giving it a greatly improved traction which is a distinct advantage over other methods of stone extraction where a straight pull as with a chain is employed to remove the stone.

When the stone 111 has been almost completely removed from the ground as illustrated in FIGURE 9, the operator then lowers the hydraulic mechanism of the tractor, thus lowering the points of the fork tines 50 to the bottom of the hole. The operator then trips the telescopically adjustable compression link 16 and moves the tractor slightly forward. When the tractor 12 is thus moved forwardly and the fork 10 is simultaneously lowered, the points of the tines drag on the bottom of the hole and the back or heel of the fork catches on the forward wall or edge of said hole. When this is done the fork 10 swings clockwise on its pivots 42 and the link 16 is collapsed or contracted. In this manner the operator may adjust the fork 10 to any desired position in which it is automatically locked by the pawl or dog 90. He then backs the tractor for forcing the tines 50 under the stone. The fork 10 with the stone 111 thereon is then elevated to transporting position.

When the link 16 is in the FIGURE 10 position, it is locked against extension because the dog 90 abuts against the vertical rear faces of the ratchet teeth 78. Once the stone is on the tines as shown in FIGURE 10, said stone can then be transported by the tractor to any convenient dumping spot, or alternatively it may be dumped on a stone boat or skid for further transportation. When the operator wishes to dump the stone, he merely trips the telescoping link 16 by means of the handle 92 and the weight of the stone automatically depresses the tines allowing the stone to slide free. The operator is then ready to dig another stone.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for extracting buried objects including a generally L-shaped member comprising an upright portion and a portion transverse thereto, first means on said member for connecting said member to the lift arms of a tractor, second means on said member spaced above said first means for adjustably connecting said member to the frame of the tractor, said second means comprising a link adjustable in length pivoted at one end to the upper end of the upright portion, the other end of the link provided with connecting means for pivotally connecting said link to the tractor frame, said link including a housing element telescopically receiving a rod element, one of said elements being provided with a row of ratchet teeth and the other element having a dog pivoted thereto engageable between said teeth for preventing relative movement between said elements in one direction.

2. An apparatus for extracting buried objects including a generally L-shaped member comprising an upright portion and a portion transverse thereto, first means on said member for connecting said member to the lift arms of a tractor, second means on said member spaced above said first means for adjustably connecting said member to the frame of the tractor, said second means comprising a link adjustable in length pivoted at one end to the upper end of the upright portion, the other end of the link provided with connecting means for pivotally connecting said link to the tractor frame, said link including a housing element telescopically receiving a rod element, one of said elements being provided with a row of ratchet teeth and the other element having a dog pivoted thereto engageable between said teeth for preventing relative movement between said elements in one direction, a locking recess formed on the same member containing said teeth, said recess located at one end of said row adjacent the pivoted end of said one element and adapted to receive said dog.

3. A device as defined in claim 1 wherein said dog is fixed to a handle, the weight of said handle urging said dog between said teeth.

4. A stone digger comprising a vertically swingable fork pivotally mounted at one end on the lift arms of a tractor, an upstanding member on the pivoted end of the fork, a telescopically adjustable compression link operatively connecting the member to the tractor and contractible in response to upward swinging movement of the fork on the arms, and means for automatically locking the link in contracted position, said link comprising a tube and a rod slidable therein, said means including ratchet teeth on the rod, and a pawl on the tube engageable with said teeth.

References Cited in the file of this patent
UNITED STATES PATENTS

| | | |
|---|---|---|
| 2,648,997 | Sawyer | Aug. 18, 1953 |
| 2,734,290 | Tuttle | Feb. 14, 1956 |
| 2,735,198 | Zogg et al. | Feb. 21, 1956 |
| 2,751,696 | Weinhold | June 26, 1956 |
| 2,863,372 | Bergerson | Dec. 9, 1958 |
| 2,980,189 | Jacobs | Apr. 18, 1961 |